United States Patent

Umemoto et al.

[11] Patent Number: 5,960,335
[45] Date of Patent: *Sep. 28, 1999

[54] DIGITAL RADIO COMMUNICATION APPARATUS WITH A RSSI INFORMATION MEASURING FUNCTION

[75] Inventors: Yuji Umemoto; Naoyuki Wakabayashi, both of Tokyo, Japan

[73] Assignee: Kabushiki Kaisha Toshiba, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/683,416

[22] Filed: Jul. 18, 1996

[30] Foreign Application Priority Data

Jul. 21, 1995 [JP] Japan .................................. 7-185496

[51] Int. Cl.$^6$ .................................................. H04B 17/00
[52] U.S. Cl. ..................................... 455/226.2; 455/234.1; 455/437; 455/553; 370/332
[58] Field of Search ............................. 455/226.2, 226.1, 455/227, 140, 436, 437, 443, 444, 229, 234.1, 234.2, 245.1, 69, 553; 370/330, 331, 332; 375/345

[56] References Cited

U.S. PATENT DOCUMENTS

| | | | |
|---|---|---|---|
| 5,142,695 | 8/1992 | Roberts et al. | 455/234.1 |
| 5,390,365 | 2/1995 | Enoki et al. | 455/553 |
| 5,493,563 | 2/1996 | Rozanski et al. | 370/332 |
| 5,551,072 | 8/1996 | Watanabe | 455/226.2 |
| 5,729,539 | 3/1998 | Heeschen et al. | 370/332 |
| 5,802,114 | 9/1998 | Koszarsky et al. | 455/226.2 |

FOREIGN PATENT DOCUMENTS 4342321  11/1992  Japan .

*Primary Examiner*—Reinhard Eisenzopf
*Assistant Examiner*—Lee Nguyen
*Attorney, Agent, or Firm*—Banner & Witcoff, Ltd.

[57] ABSTRACT

A radio communication apparatus according to the present invention is provided with first and second correction tables for correcting the measurement values of RSSI information by reception condition. The apparatus measures not only the RSSI information of the radio channel in a reception period of the radio channel assigned to itself by a TDMA scheme but also the reception period of the other radio channels in an idle period, and then corrects the RSSI information measurement values on the basis of the first and second correction tables. The corrected RSSI information measurement data is reported to the base station for MAHO.

17 Claims, 6 Drawing Sheets

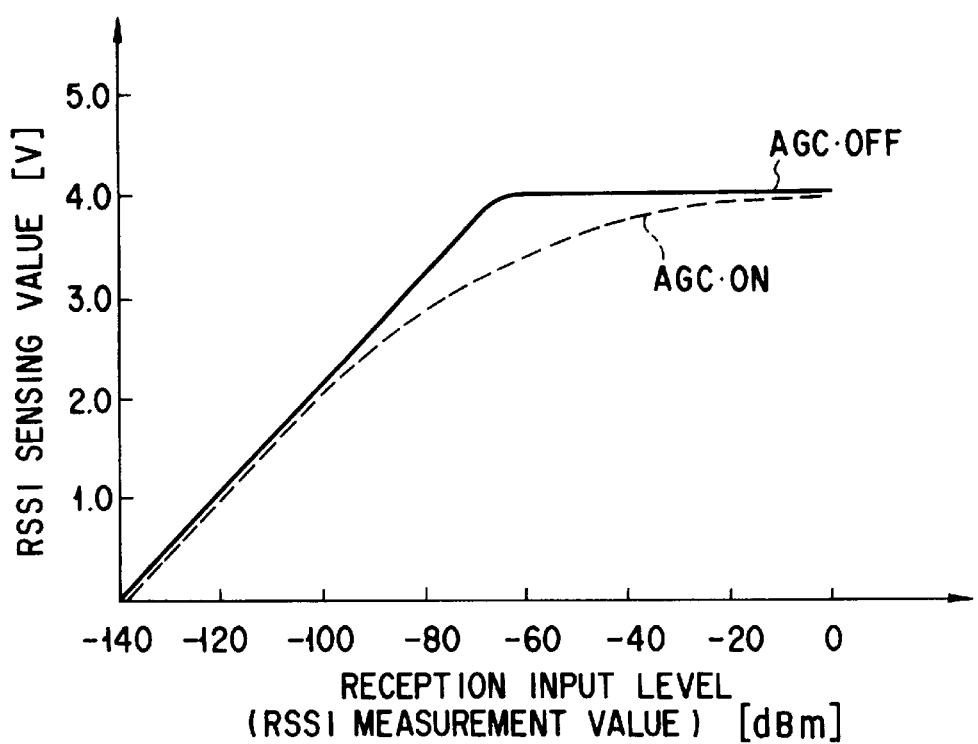
F I G. 4
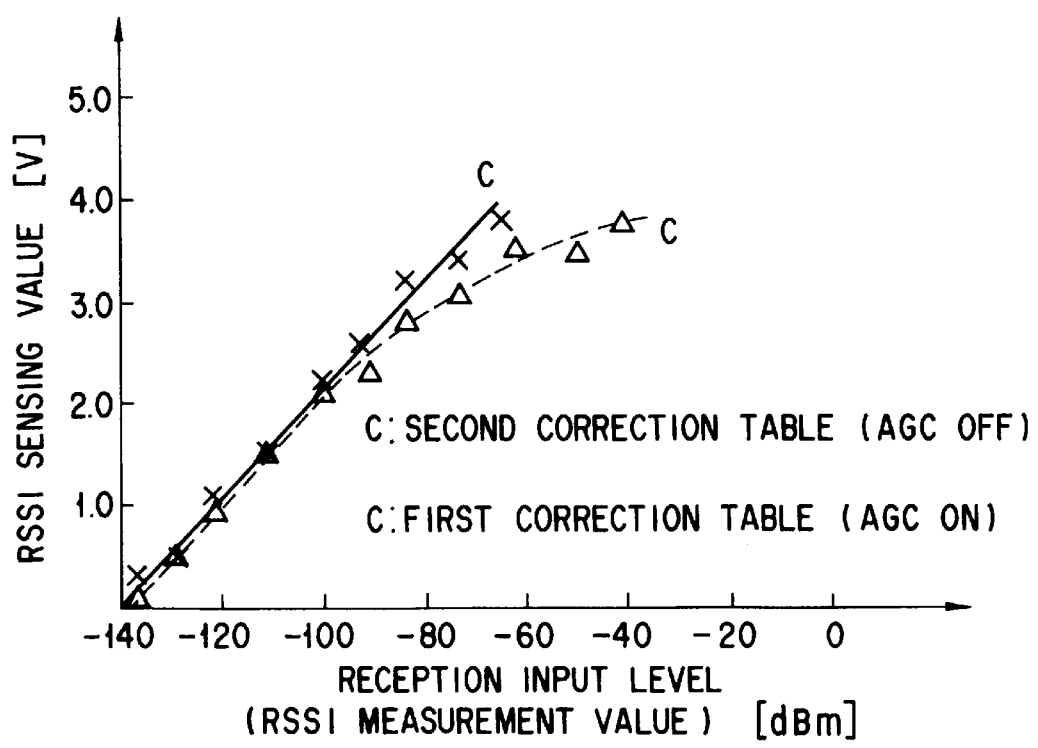
F I G. 5

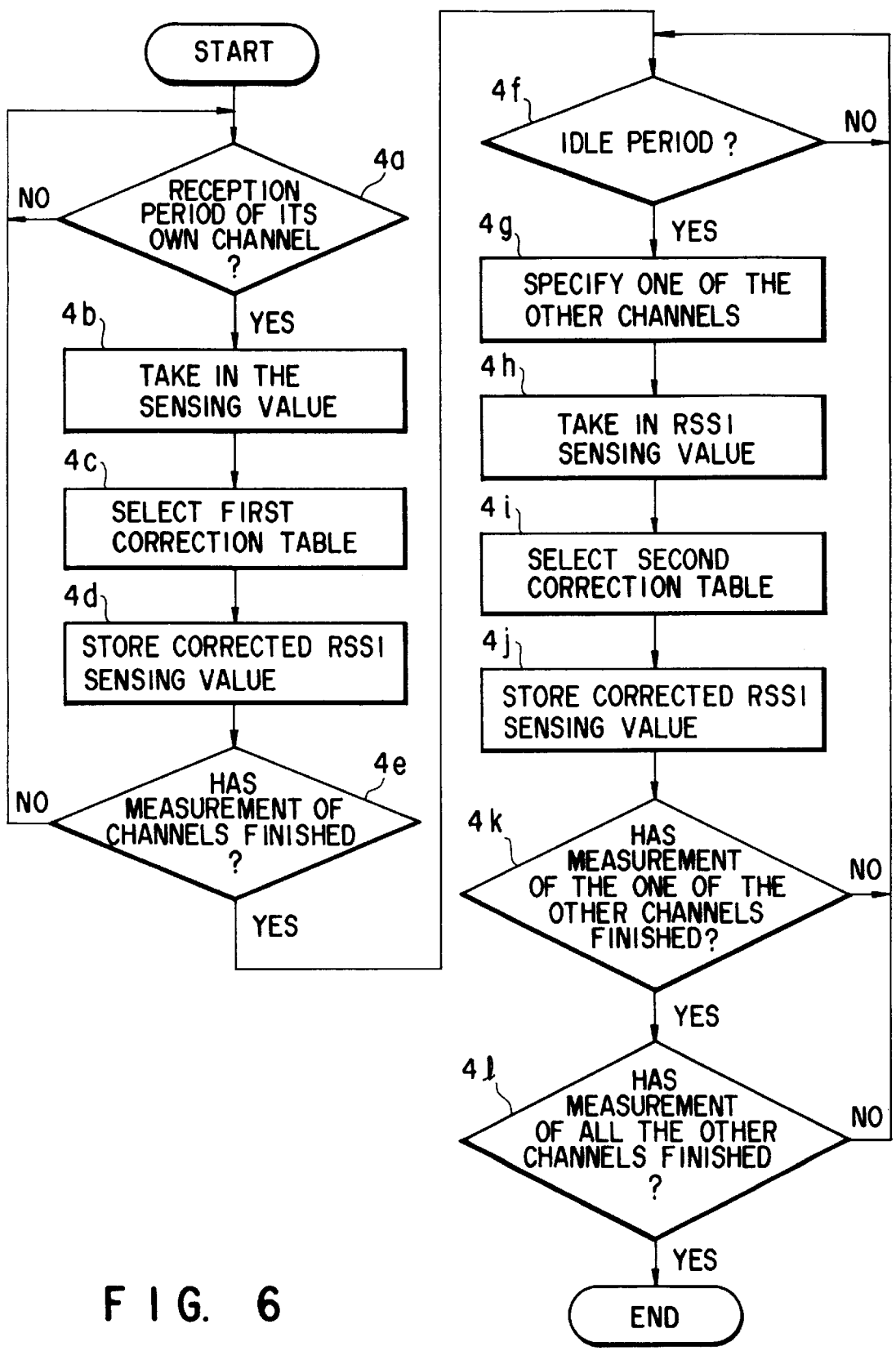
F I G. 6

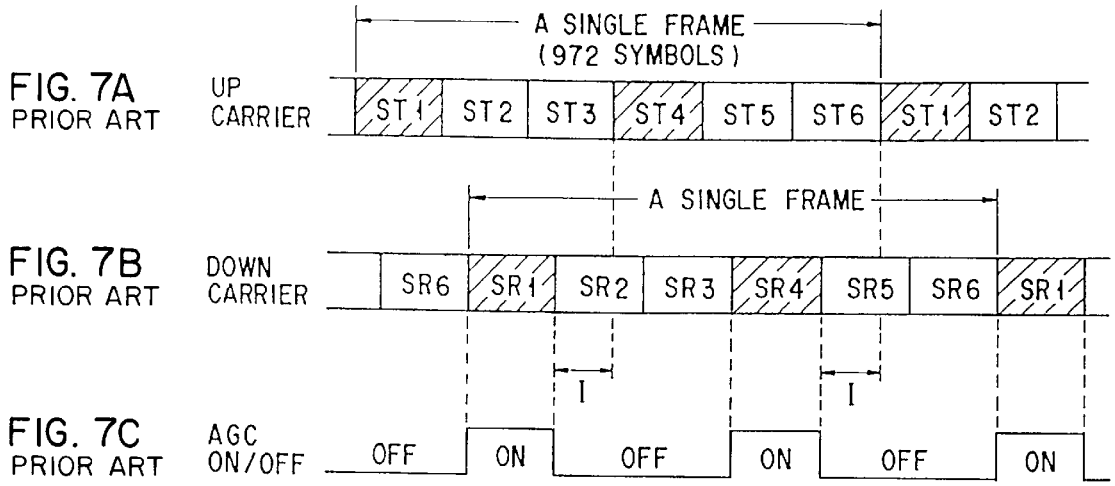
FIG. 7A PRIOR ART
FIG. 7B PRIOR ART
FIG. 7C PRIOR ART
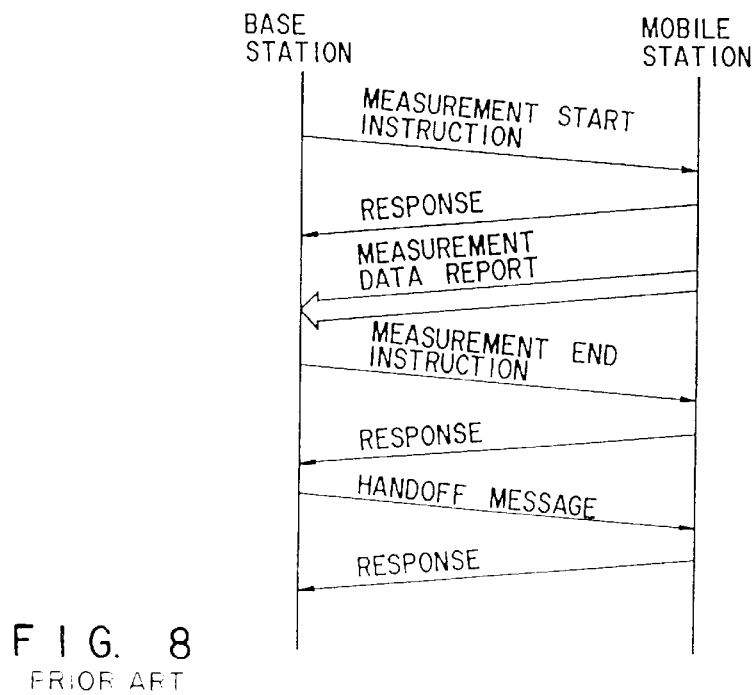
FIG. 8
PRIOR ART

DIGITAL RADIO COMMUNICATION APPARATUS WITH A RSSI INFORMATION MEASURING FUNCTION

BACKGROUND OF THE INVENTION

1. Field of the Invention

This invention relates to a radio communication apparatus used in a cellular mobile radio communication system, such as a mobile telephone system, a hand held phone system, or a cordless telephone system, and more particularly to a digital radio communication apparatus having the function of measuring the reception signal strength indicator (RSSI) information of radio channels.

2. Description of the Related Art

In recent years, a digital scheme has been replacing an analog scheme and getting dominant in the field of cellular mobile communication systems.

The digital scheme is such that in the transmission apparatus, the audio signal and data are coded and the carrier is modulated digitally by, for example, a QPSK (quadrature phase shift keying) scheme using the coded signal, and then the modulated carrier sent from the transmission apparatus is received by the reception apparatus, in which the received signal is demodulated digitally, and thereafter the demodulated signal is decoded to reproduce the audio signal and data.

Furthermore, many digital cellular mobile radio communication systems have used a time-division multiple access (TDMA) scheme as a radio channel accessing method. The TDMA scheme is such that a plurality of stations transmit signals using the same carrier in such a manner that the signals may not overlap each other in time. FIG. 7 shows an example of a frame format in the TDMA scheme. In each of an up carrier and a down carrier, a single frame consists of six time slots. When a mobile station gets into communication with a base station, a pair of empty time slots is selected from the six pairs of time slots in the half rate transmission mode, whereas two pairs of empty time slots are selected from the six pairs of time slots in the full rate transmission mode. Then, the selected slot pairs are assigned to the mobile station as radio channels. FIG. 7 shows an example of allocating time slots in the full rate transmission mode. The shaded portions ST1, SR1 and ST4, SR4 indicate the assigned slots.

This type of system provides what is called MAHO (mobile assisted hand-off), which is such that when the quality of the radio channel has deteriorated during communication, the radio channel is changed to another radio channel. FIG. 8 illustrates the operation sequence of MAHO.

The mobile station always measures the RSSI information of the radio channel now in use and the other radio channels and the bit error rate (BER). The measuring of the RSSI and BER of the radio channel now in use is done in a reception slot period SR1. The measuring of the RSSI and BER of the other radio channels is effected in an idle period I excluding reception slot period SR1 and transmission slot period ST1. It is assumed that in this state, the base station has sent a measurement instruction to the mobile station now in communication. Then, the mobile station returns a response to the instruction and then reports the latest measurement data on the RSSI and BER obtained at this time to the base station. Receiving the report of the measurement data, the base station instructs the mobile station to end the measurement. After the mobile station has returned a response to the end instruction, the base station judges the quality of the radio channel now being used, on the basis of the measurement data. If the quality of the radio channel currently being used has deteriorated below a specific level, the base station will instruct the mobile station to hand off the channel to another empty channel. In response to the hand-off instruction, the mobile station hands off the channel to a new radio channel and thereafter communicates with the base station through the new radio channel. Therefore, for example, even if the mobile station has moved to another cell during communication, it can continue communication.

When MAHO is performed, however, conventional radio communication apparatuses have caused the following problem. In a radio communication apparatus used in a digital mobile radio communication system, an AGC circuit is provided in the reception system. The AGC circuit functions so that the received signal may not be saturated even when a high-level modulated signal has been received, and thereby enables the amplitude information component of the QPSK modulated signal to be demodulated accurately. For this reasons the time constant of AGC is set at a value (e.g., 400 msec) large enough to prevent the amplitude information component of the QPSK modulated signal from being followed up.

In a radio communication apparatus using the TDMA scheme, the AGC circuit is brought into an operating state only in the reception slot periods SR1 and SR4 of its own station and is out of operation in the other periods as shown in FIG. 7. Since the AGC circuit has a small time constant as indicated above, it holds AGC value at the end of the reception slot and it starts operating with this AGC value when the next reception slot assigned to the station is supplied to the station. During any other channel period, the AGC circuit remains inoperative. This is because the AGC loop cannot operate as fast as the AGC circuit during this period since the RSSI-measuring time is much shorter (about 2 msec) than the AGC time constant. Because of this, the conditions for the measurement of RSSI in the reception slot periods SR1, SR4 differ from those for the measurement of RSSI in the idle period I, depending on the on/off operation of the AGC circuit, with the result that RSSI cannot be measured accurately.

SUMMARY OF THE INVENTION

The object of the present invention is to make it possible to always measure the quality of radio channels accurately by eliminating the effect of changes in the reception conditions.

To achieve the object, a radio communication apparatus of the present invention is provided with first and second correction tables for correcting the measurement values of RSSI information by reception condition. Then, the apparatus measures not only the RSSI information of the radio channel in a reception period of the radio channel assigned to itself by a TDMA scheme but also the RSSI information of the other radio channels in an idle period, and then corrects the RSSI information measurement values on the basis of the first and second correction tables.

Therefore, with the present invention, by previously preparing the first and second correction tables so as to correspond to, for example, the reception conditions that change, depending on whether the AGC circuit is on or off, both of the measurement values of RSSI information obtained when the AGC circuit was on and the measurement values of RSSI information obtained when the AGC circuit was off are corrected on the basis of the most suitable correction tables.

This makes it possible to always obtain the accurate RSSI information measurement data, regardless of whether the AGC circuit is on or off. Therefore, use of the RSSI information measurement data makes it possible to always carry out accurate hand-off.

Two methods of measuring RSSI information can be considered. One method is to start the measurement of RSSI information at the request of the base station and report the obtained measurement data directly to the base station. With this method, because the radio communication apparatus measures the RSSI information only when an request has arrived from the base station, the apparatus can not only always report the latest measurement data to the base station but also suppress the power consumption of the apparatus.

The other method is to allow the radio communication apparatus to start the measurement of RSSI information at regular intervals or with arbitrary timing and store the obtained measurement data. Then, when a request has arrived from the base station, the apparatus reads the measurement data and reports it to the base station. With the method, the measurement data can be reported in a short time at the request of the base station, enabling high-speed hand-off.

The following method is effective in determining measurement data. The measurement of the RSSI information of a single radio channel is made a plurality of times. The RSSI information measurement values obtained from the measurements are corrected on the basis of the correction tables. Then, the average of these corrected measurement values is taken and determined to be the measurement data. Use of these methods makes it possible to reduce the effect of a temporary change in the transmission characteristics, including fading, and therefore determine the RSSI information accurately.

Furthermore, with a radio communication apparatus that selectively uses a TDMA scheme and an FDMA scheme as a radio accessing scheme to the base station, correction tables are provided so as to correspond to the reception conditions in a radio channel (a first period) assigned by the TDMA scheme, the reception conditions in an idle period (a second period) excluding the radio channel, and the reception conditions in a radio channel (a third period) assigned by the FDMA scheme. Then, the RSSI information measurement values obtained in each of the first, second, and third periods are corrected on the basis of each of the first, second, and third correction tables, thereby producing the accurate measurement data corresponding to the respective reception conditions.

By doing this, the correction of RSSI information measurement values can be effected accurately according to each mode even with a radio communication apparatus of a dual mode combining an analog mode and a digital mode. This makes it possible to perform accurate hand-off in either the analog mode or the digital mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description-given above and the detailed description of the preferred embodiments given below, serve to explain the principles of the invention.

FIG. 4 shows the RSSI sensing characteristic of AGC being on and off;

FIG. 5 illustrates the correction curves of the first and second correction tables;

FIG. 6 is a flowchart for the RSSI measurement procedure and its description;

FIG. 7 illustrates a frame format in the TDMA scheme and the AGC on/off timing; and FIG. 8 shows an example of the sequence of MAHO.

DETAILED DESCRIPTION OF THE PREFERRED EMBODIMENTS

Figure 1:
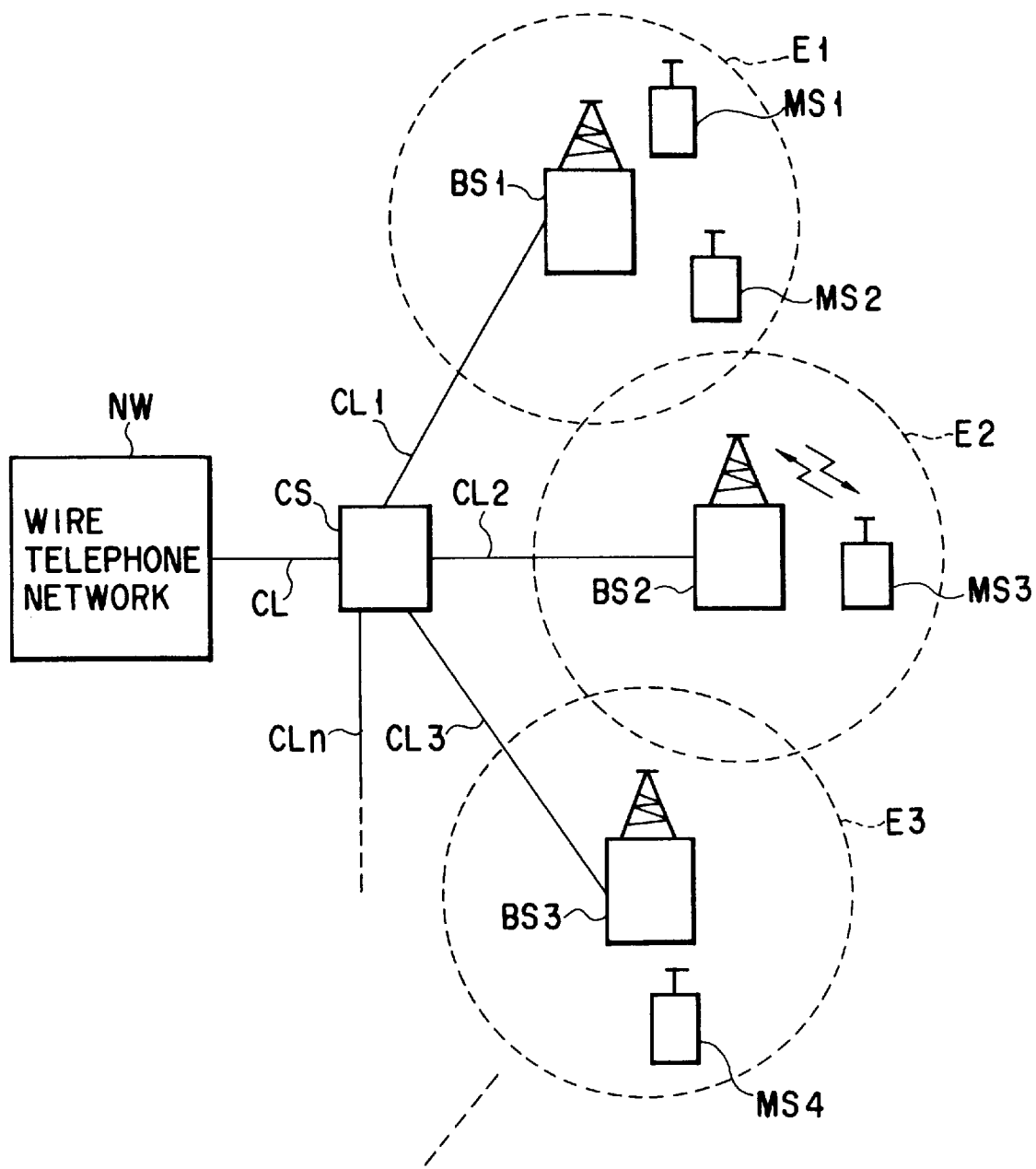
FIG. 1 is a schematic representation of a configuration of a cellular radio communication system according to an embodiment of the present invention.

FIG. 1 shows a schematic configuration of a dual-mode cellular mobile radio communication system according to an embodiment of the present invention. This system comprises a control station CS, a plurality of base stations BS1 to BS3, and a plurality of mobile stations MU1 to MU4. The control station CS is connected to a wire telephone network NW via a cable channel CL. The base stations BS1 to BS3 are connected to the control station CS via the cable channels CL1 to CL3, respectively. The base stations BS1 to BS3 form radio zones E1 to E3, respectively. The mobile stations MS1 to MS4 are connected to the base stations BS1 to BS3 via radio channels in the radio zones E1 to E3 of the base stations BS1 to BS3, respectively. The radio channels are roughly divided into a control channel group and a speech channel group. The speech channel group consists of a plurality of analog speech channels for an analog mode and a plurality of digital speech channels for a digital mode.

Figure 2:
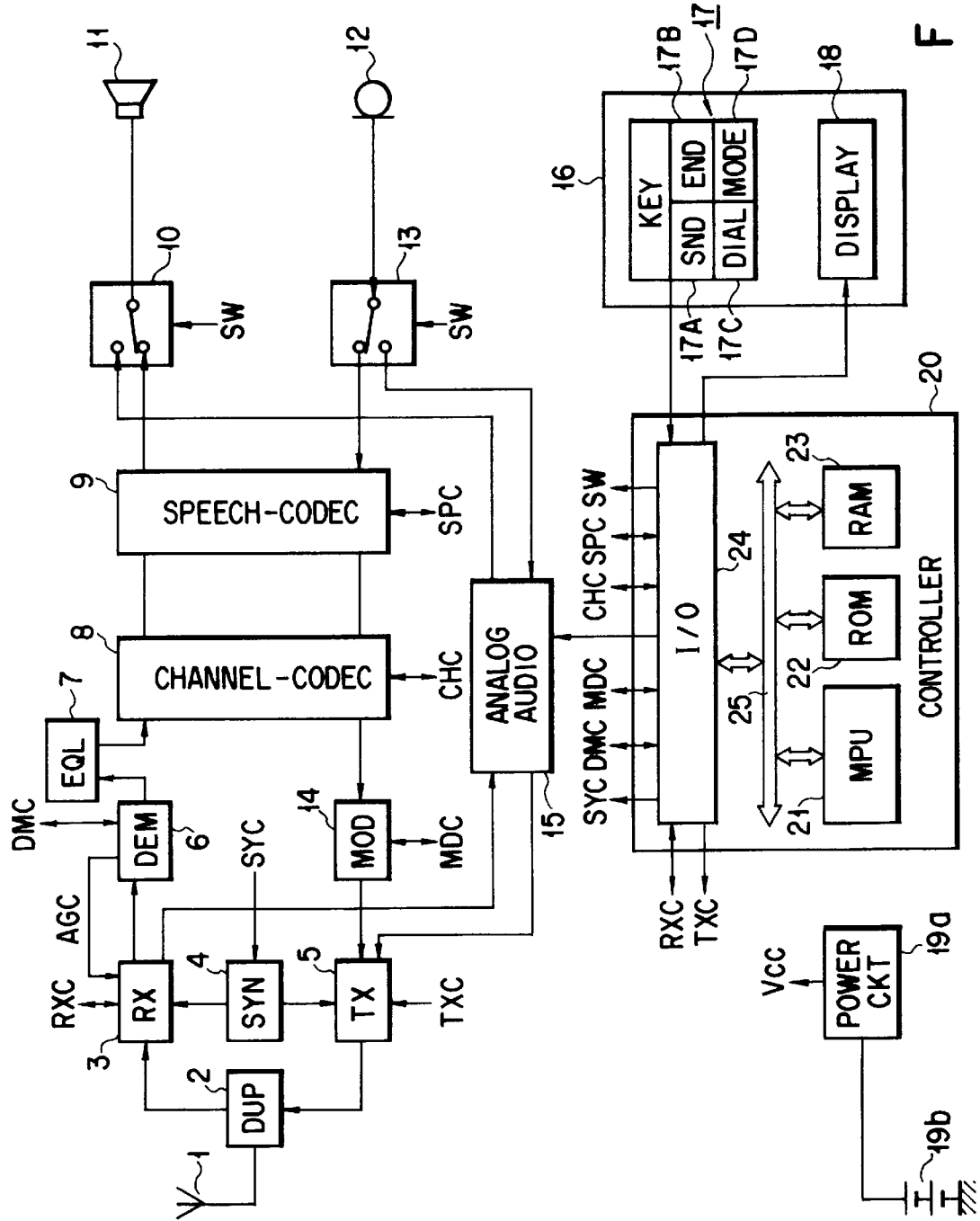
FIG. 2 is a circuit block diagram of a hand held phone according to an embodiment of the present invention.

The mobile stations MS1 to MS4 include mobile telephones and hand held phones. Each of the hand held phones is constructed as follows. FIG. 2 is a circuit block diagram showing the configuration of a hand held phone.

In the figure, with the digital mode being on, the radio-frequency signals sent from the base stations BS1 to BS3 are received by an antenna 1 and inputted to a receiver 3 via a duplexer 2. The receiver 3 mixes the radio-frequency signals with the reception local oscillation signal outputted from a frequency synthesizer (SYN) 4 to down-convert them into a reception intermediate-frequency signal. The frequency of the reception local oscillation signal generated by the frequency synthesizer 4 is specified by the channel control signal SYC outputted from a controller 20.

The reception intermediate frequency signal outputted from the receiver 3 is converted into a digital signal at an A/D converter (not shown) and then is inputted to a digital demodulator 6. The digital demodulator 6 demodulates the reception intermediate frequency signal digitally to convert it into a digital baseband signal. The digital baseband signal outputted from the digital demodulator 6 includes a digital speech signal and a digital control signal. Of them, the digital control signal DMC is taken in by the controller 20, which identifies it.

On the other hand, the demodulated waveform of the digital speech signal is equalized at an equalizer 7 and then inputted to a channel-encoder/decoder (hereinafter, referred to as a channel-codec) 8. The channel-codec 8 performs an error-correction decoding process on the digital speech signal supplied from the equalizer 7. The error-correction decoded digital speech signal is inputted to a speech-encoder/decoder (hereinafter, referred to as a speech-codec) 9. The speech-codec 9 performs a speech decoding process on the digital speech signal. The speech signal outputted from the speech-codec 9 is converted into an analog speech signal at a D/A converter (not shown) and is then inputted to an analog switch 10. In response to the switch control signal SW outputted from the controller 20, the analog switch 10 is controlled so that the receiving speech signal outputted from the speech-codec 9 may be selected and outputted with the digital mode being on. As a result, the receiving speech signal outputted from the speech-codec 9 is supplied via the analog switch 10 to a speaker 11, which amplifies and outputs the signal.

In contrast, the user's sending speech signal collected by a microphone 12 is inputted to an analog switch 13. At this time, in response to the switch control signal SW outputted from the controller 20, the analog switch 13 is controlled so that the sending speech signal may be inputted to the speech-codec 9 with the digital mode being on. Therefore, the sending speech signal is converted into a digital sending speech signal at an A/D converter (not shown) via the analog switch 13 and then is inputted to the speech-codec 9.

The speech-codec 9 performs a speech coding process on the digital sending speech signal. The digital sending speech signal outputted from the speech-codec 9, together with the digital control signal from the controller 20, is inputted to the channel-codec 8. The channel-codec 8 performs an error correction coding process on both of the digital sending speech signal and digital control signal. The coded digital sending speech signal is inputted to a digital modulator 14.

According to the digital sending speech signal, the digital modulator 14 generates a signal modulated by a π/4 DQPSK (π/4 shifted differentially encoded quadrature phase shift keying) scheme. The modulated signal is converted into an analog signal at a D/A converter (not shown) and then is inputted to a transmitter 5. The transmitter 5 combines the analog signal with the transmission local oscillation signal from the frequency synthesizer 4 to up-convert it to a radio transmission signal and further high-frequency-amplifies the radio transmission signal. Then, the radio transmission signal from the transmitter 5 is supplied via the duplexer 2 to the antenna 1, which transmits the signal to the base station.

On the other hand, with the analog mode being on, the radio frequency signal sent via an analog speech channel from the base station is received by the antenna 1 and then is inputted via the duplexer 2 to the receiver 3, which down-converts it into a reception intermediate frequency signal. The reception intermediate frequency signal from the receiver 3 is inputted to an analog audio circuit 15. The analog audio circuit 15 FM-demodulates the reception intermediate frequency signal and then audio-amplifies the demodulated signal. The baseband analog speech signal from the analog audio circuit 15 is inputted to the analog switch 10. At this time, with the analog mode being on, the analog switch 10 has been controlled by the switch control signal SW from the controller 20 so that the analog speech signal may be selected and outputted. The analog speech signal from the analog audio circuit 15 is supplied via the analog switch 10 to the speaker 11, which amplifies and outputs the signal.

In contrast, the talker's speech signal collected by the microphone 12 and subjected to acoustoelectric conversion is inputted to the analog switch 13. At this time, with the analog mode being on, the analog switch 13 has been controlled by the switch control signal SW from the controller 20 so that the sending speech signal may be inputted to the analog audio circuit 15. The sending speech signal is inputted to the analog audio circuit 15 via the analog switch 13. According to the sending speech signal, the analog audio circuit 15 generates an FM-modulated signal and inputs it to the transmitter 5. The transmitter 5 mixes the FM-modulated signal with the transmission local oscillation signal generated from the frequency synthesizer 4 to up-convert the signal to a radio-frequency signal and then high-frequency-amplifies the signal. The radio-frequency signal from the transmitter 5 is supplied via the duplexer 2 to the antenna 1, which transmits the signal toward the base station.

A console unit 16 is provided with a key switch group 17 and a display 18. The display 18 is composed of, for example, a liquid-crystal display unit (LCD). The key switch group 17 is made up of a transmission key 17A, an end key 17B, a dial key 17C, and a mode specify key 17D. Of them, the mode specify key 17D is used to allow the user to specify the analog mode, the digital mode, or the dual mode specifying no particular mode. A power supply circuit 19a generates the required operating voltage Vcc on the basis of the output of a battery 19b and supplies it to each of the above circuits.

Figure 3:
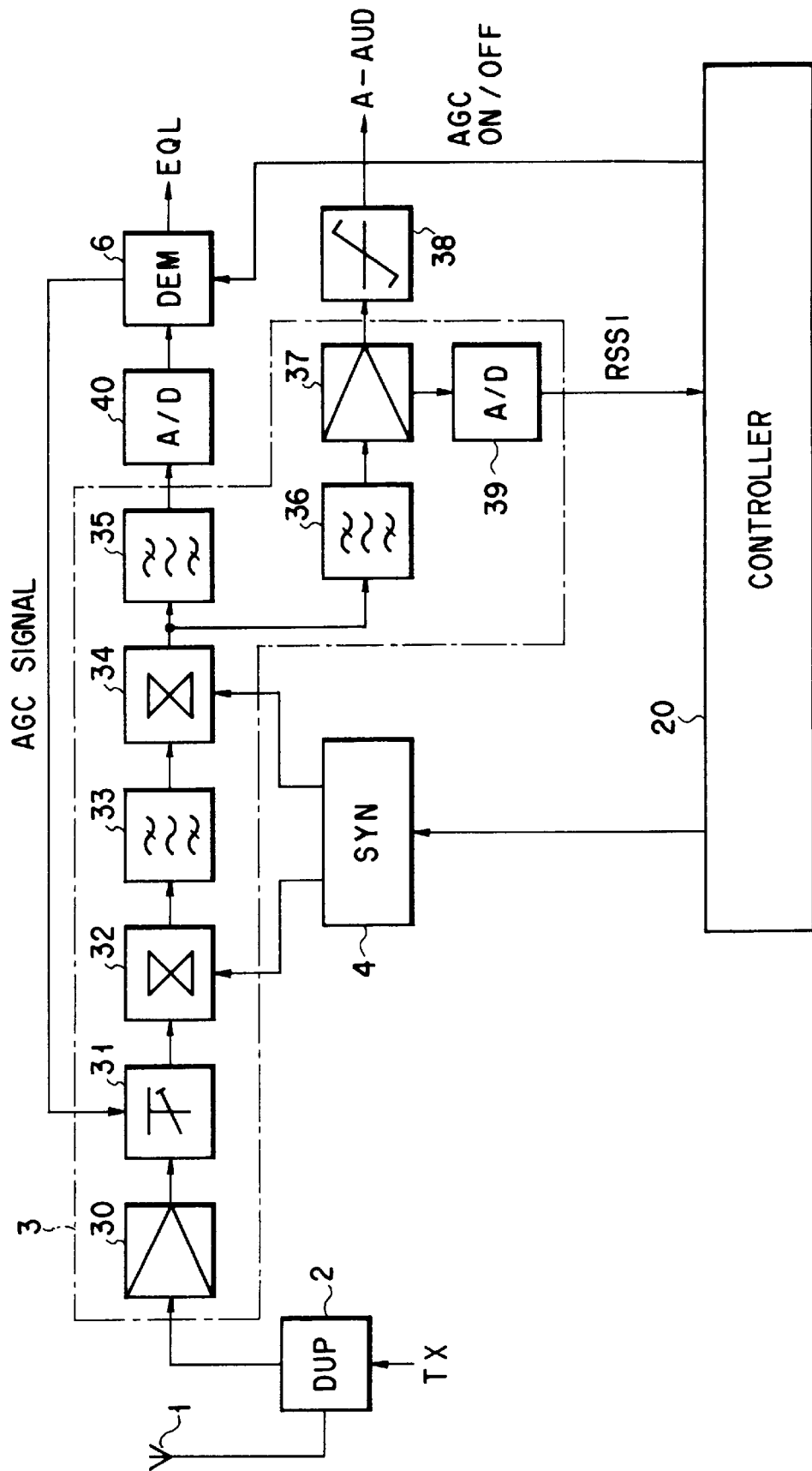
FIG. 3 is a circuit block diagram of the important portion of the hand held phone shown in FIG. 2.

FIG. 3 is a further detailed circuit block diagram showing the configuration of the reception system of the mobile stations MS1 to MS4 explained above.

In the figure, in the receiver 3, the reception radio frequency signal is first high-frequency amplified at a high-frequency amplifier 30 and inputted to a variable attenuator 31. The variable attenuator 31 controls the amplitude level of the reception radio frequency variably. The attenuator receives the amount of attenuation from an AGC circuit provided in the digital modulator 6, which will be explained later.

The reception radio frequency signal from the variable attenuator 31 is inputted to a first mixer 32. The first mixer 32 mixes the reception radio frequency signal with a first reception local oscillation signal generated from the frequency synthesizer 4 to down-convert the signal to a first reception intermediate frequency signal. The first reception intermediate frequency signal passes through a first intermediate frequency filter 33 and is inputted to a second mixer 34, which further down-converts the signal into a second reception intermediate frequency signal.

In the digital mode, the second reception intermediate frequency signal is allowed to pass through a second intermediate frequency filter 35 and is converted into a digital signal at an A/D converter 40, and thereafter is inputted to the digital demodulator 6. The digital demodulator 6 not only performs synchronizing control but also demodulates the reception intermediate frequency signal by a detection scheme following the π/4 shifted DQPSK scheme. In the digital modulator 6, an AGC circuit is provided. The AGC circuit senses the amplitude level of the reception intermediate frequency signal, compares the amplitude level with a threshold value, and thereby senses the error. Then, the AGC circuit generates an AGC signal to make the error approach to zero. The AGC signal is returned to the variable attenuator 31.

In the analog mode, the second reception intermediate frequency signal is allowed to pass through a band-pass filter 36 and then is inputted to an intermediate frequency amplifier 37. The intermediate frequency amplifier 37 performs limited amplification to FM-modulate the second reception intermediate frequency signal. The amplified reception intermediate frequency signal is inputted to a discriminator 38 in the analog audio circuit 15. The discriminator 38 FM-demodulates the signal to a reception baseband signal.

The intermediate frequency amplifier 37 includes a circuit for sensing the amplitude level of the second reception intermediate frequency signal. The amplitude level sensed by the circuit is converted into a digital signal at an A/D converter 39 and then taken in by the controller 20 as an RSSI sensing signal.

The controller 20 includes a microprocessor (MPU) 21. To the microprocessor 21 a ROM 22, a RAM 23, and an input/output port (I/O) 24 are connected via a bus 25.

The ROM 22 stores not only all of the control programs necessary for radio communication and part of the control data but also first and second RSSI correction tables.

The first RSSI correction table stores the correction data corresponding to the RSSI measurement data obtained with AGC in an operating state (on). The second RSSI correction table stores the correction data corresponding to the RSSI measurement data obtained with AGC in a nonoperating state (off). In FIG. 5, C1 and C2 indicate the characteristics of the correction data items stored in the first and second correction tables, respectively. These correction data items are created on the basis of the RSSI sensing characteristics with AGC being on and off in FIG. 4. These RSSI sensing characteristics are obtained by theoretical calculation or experiment.

The RAM 23 stores not only the dial information and reception control information inputted from the key group 17 but also the corrected RSSI measurement data and BER sensing data to be reported to the base station for MAHO.

The microprocessor 21 executes various control processes associated with radio communication on the basis of the control programs and control data stored in the ROM 22 and the control information stored in the RAM 23. The control processes include RSSI measurement control related to MAHO, which is the feature of the present invention.

Hereinafter, the RSSI measurement operation in a hand held phone thus constructed will be described according to the control procedure of the controller 20. FIG. 6 is a flowchart showing the control procedure and the description of the control.

When communication with the base station has been started, the hand held phone gives an on/off control signal for on/off control of AGC operation to the digital modulator 6. For example, it is assumed that the slots ST1, SR1 and ST4, SR4 shown in FIG. 7 have been assigned as radio channels. Then, the controller 20 gives the digital demodulator 6 an on/off control signal that turns AGC on in the reception periods of slots SR1, SR4 and turns AGC off in the other periods. Because of this, in the receiver 3, amplitude control by AGC is effected only in a reception period of its own slot. In the AGC operation, the last AGC signal in the reception period of its own slot is held. When the next reception period of its own slot has been reached, the AGC operation is started again with the held AGC signal as the initial value.

During the above communication operation, at step 4a, the controller 20 of the hand held phone monitors whether the reception period of the channel assigned to itself has been reached. In the example shown in FIG. 7, the controller monitors whether the reception period of slot SRI or SR4 has been reached. When the reception period of its own channel has been reached, the controller, at step 4b, takes in the RSSI sensing value from the receiver 3, while carrying out control related to the reception and reproduction of the communication signal addressed to itself sent from the base station.

Next, at step 4c, the controller 20 selects a correction table. At present, the reception period of its own channel is lasting, so that the controller selects the first correction table corresponding to the reception operating conditions for AGC being on. Then, at step 4d, the controller corrects the RSSI sensing value on the basis of the first correction table and stores the corrected RSSI sensing value in the RAM 23. At step 4e, the controller judges whether the RSSI of its own slot has been measured a preset number of times (e.g., three times). If measurement has not been made the preset number of times, control will be returned to step 4a, where the RSSI of its own channel will be measured repeatedly. After as many measurements as the preset number have been made, the average of the individual corrected RSSI sensing values obtained from the measurements is taken. The average is stored in the RAM 23 as the RSSI measurement data on its own channel.

As described above, by computing the average of the RSSI sensing values, the accurate RSSI measurement data can be obtained, reducing the effect of a drop in the reception signal level, even when the reception signal level drops temporarily due to, for example, the effect of fading.

Next, at step 4f, the control circuit 20 monitors whether an idle period has been reached. An idle period I is a period I between its own transmission slots ST1 and ST4 and its own reception slots SR1 and SR4. When an idle period I has been reached, the controller 20, at step 4g, sets in the frequency synthesizer 4 another channel whose RSSI should be measured. Then, when the radio channel has been received, the controller, at step 4h, takes in the RSSI sensing value from the receiver 3 and, at step 4i, select a correction table. Since the controller is now receiving the idle period I, AGC is off. For this reason, the controller selects the second correction table corresponding to the reception operating conditions for AGC being off.

At step 4j, the RSSI sensing value is corrected on the basis of the second correction table. The corrected RSSI sensing value is stored in the RAM 23. At step 4k, it is judged whether the RSSI of the different channel has been measured a preset number of times (e.g., three times). If the measurement has not been made the preset number of times, control will be return to step 4f, where the measurement of RSSI of the same different channel will be made repeatedly. Then, after as many measurements as the preset number have been made, the average of the individual corrected RSSI sensing values obtained from the measurements is taken. The average is stored in the RAM 23 as the RSSI measurement data on the different channel.

Finally, at step 4l, it is judged whether the RSSI has been measured for all of the other channels. If any one of the other channels has not been measured in RSSI, control will be returned to step 4f, where the above-described measuring operations will be repeated. In contrast, when the RSSI has been measured for all of the other channels, the measurement of RSSI is terminated.

The RSSI measuring operation described above is carried out, for example, at regular intervals during communication. Then, each time measurement is made, the measurement data stored in the RAM 23 is updated to new measurement data.

Now, it is assumed that in this state, a measurement start instruction has arrived from the base station. Then, after the hand held phone has returned a response as shown in FIG.

8, it reads the RSSI measurement data on its own channel and the RSSI measurement data on each of the other channels from the RAM 23 and sends these measurement data items to the base station. At the same time, the hand held phone also sends the BER measurement data on its own channel to the base station.

On the basis of the RSSI measurement data and the BER measurement data on the individual channels sent from the hand held phone, the base station selects the most suitable channel as a hand-off destination channel and reports the selected channel to the hand held phone. Receiving the report, the hand held phone switches the radio channel now in communication to the reported different channel. This effects the hand-off of the radio channel and the hand held phone can continue conversation via the new radio channel.

As described above, with the present embodiment, the first correction table and the second correction table are provided so as to correspond to the reception operating conditions for AGC being on and those for AGC being off, respectively. The RSSI sensing values obtained in an AGC-on period is corrected on the basis of the first correction table and the corrected value is stored in the RAM 23, whereas the RSSI sensing value obtained in an AGC-off period is corrected on the basis of the second correction table and the corrected value is stored in the RAM 23. Then, in response to a measurement start request from the base station, the individual corrected RSSI measurement data items are read from the RAM 23. These RSSI measurement data items are reported to the base station for control of MAHO.

Accordingly, both of the RSSI sensing values obtained when AGC was on and the RSSI sensing values obtained when AGC was off are corrected on the basis of the most suitable correction tables, respectively. This makes it possible to always obtain the accurate RSSI measurement data, regardless of the on/off state of AGC. Use of the RSSI measurement data always enables accurate handoff.

Additionally, with the embodiment, when the RSSI measurement data is obtained for each radio channel, the sensing of RSSI is done a plurality of times for each radio channel, and the average of these RSSI sensing values is taken. Because of this, even when the level of the received signal has dropped temporarily due to, for example, the effect of fading, the accurate RSSI measurement data can be obtained, reducing the effect of a drop in the level of the received signal.

Furthermore, with the embodiment, the hand held phone measures RSSI at regular intervals during communication and stores the measurement data in the RAM 23. When a measurement start request has arrived from the base station, the phone reads the measurement data from the RAM 23 and reports it to the base station. This helps extremely shorten the time from when the base station sent the measurement start request until the RSSI measurement data has been reported, shortening the time required for hand-off control.

The present invention is not restricted to the above embodiment. For instance, at the time when a measurement start request has arrived from the base station, the measurement of RSSI may be started and the measurement data obtained from the measurement be reported to the base station. Although this makes longer the time from when the base station transmitted a measurement start request until the hand held phone has obtained the measurement data, the approach makes it possible to always get the latest measurement data, enabling more accurate channel selection. Additionally, since the hand held phone carries out an RSSI measuring operation only when having received a measurement start request from the base station, electric power wastefully consumed in measuring RSSI can be reduced, making the battery service life longer.

While in the embodiment, RSSI is measured a plurality of times for the other channels after RSSI has been measured a plurality of times for its own channel, RSSI may be measured as follows. After the sensing of RSSI is done once for its own channel, then the sensing of RSSI is done once for the other channels. Thereafter, these operations are repeated a plurality of times.

Furthermore, while in the embodiment, the average of the individual RSSI sensing values is taken each time RSSI has been measured a specific number of times, the average may be computed and reported to the base station as follows. The individual RSSI sensing values are directly stored without taking the average of them. At the time when a measurement start request has arrived from the base station, as many RSSI sensing values as the latest specified number of times are selected and the average of them is taken. Then, the average is reported to the base station.

In addition, when the RSSI measurement data is obtained, the maximum value may be found instead of taking the average of a plurality of RSSI sensing values. From M (M≦3) RSSI sensing values, L (L<M) ones close to each other in value may be selected and the average of these L RSSI sensing values be taken. This enables extraordinary values to be removed from the plurality of RSSI sensing values, increasing the accuracy of the RSSI measurement data.

Furthermore, while the embodiment, the case where RSSI is measured only in the digital mode in the dual-mode radio communication apparatus has been explained, the present invention may be applied to a case where RSSI measurement is made in the analog mode. Specifically, in this case, in addition to the first correction table corresponding to the reception operating conditions for AGC being on in the digital mode and the second correction table corresponding to the reception operating conditions for AGC being off in the digital mode, a third correction table corresponding to the reception operating conditions in the analog mode should be provided. The RSSI sensing values can be corrected by selectively using these correction tables.

Still furthermore, in the embodiment, the case where the present invention has been applied to an RSSI measurement operation carried out during communication, has been described. Besides this, for example, the invention may be applied to an RSSI measurement operation carried out at the time when the power of the radio communication apparatus is turned on and later in the waiting period. Specifically, some cellular radio systems turn off AGC when the power is turned on in the mobile station, and scan the control channels. When finding a waiting control channel by the scanning, they turn on AGC. With such systems, the RSSI sensing values obtained in scanning the control channels are corrected on the basis of the second correction table of the present invention, whereas the RSSI sensing values obtained during the waiting time are corrected on the basis of the first correction table.

Still furthermore, besides dual-mode radio communication apparatuses, the present invention may be applied to the digital-mode-only radio communication apparatuses. Additionally, as long as radio communication apparatuses are required to measure the quality of reception under different reception operating conditions, the present invention may be applied to radio communication apparatuses used in an European GSM (global system for mobile communication) system and those used in a Japanese handheld phone system and PHS (personal handyphone system), as well as radio communication apparatuses used in a U.S. digital cellular radio system.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. In a mobile radio communication system that assigns a radio channel by a TDMA scheme to a radio communication apparatus intending to communicate and enables said radio communication apparatus to get into radio communication with a base station via the assigned radio channel, said radio communication apparatus comprising:

first measuring means for measuring the RSSI information of the radio channel in a first period corresponding to said assigned radio channel;

second measuring means for measuring the RSSI information of the other radio channels in a second period corresponding to an idle period for the radio channels excluding said assigned radio channel;

a first and second correction tables provided so as to correspond to the reception conditions in said first period and the reception conditions in said second period; and correction means that corrects the RSSI information measurement values obtained from said first measuring means on the basis of said first correction table and determines the corrected RSSI information measurement values to be first measurement data and that corrects the RSSI information measurement value obtained from said second measuring means on the basis of said second correction table and determines the corrected RSSI information measurement values to be second measurement data.

2. A radio communication apparatus according to claim 1, wherein said first and second measuring means each starts the measurement of RSSI information at the request of said base station, and said correction means corrects the RSSI information measurement values obtained from said first and second measuring means and reports the corrected first and second measurement data items to said base station.

3. A radio communication apparatus according to claim 1, wherein said first and second measuring means each starts the measurement of RSSI information independently, and said correction means corrects the RSSI information measurement values obtained from said first and second measuring means, stores the corrected first and second measurement data items, and reads these first and second measurement data items at the request of said base station and then reports these data items to said base station.

4. A radio communication apparatus according to claim 1, 2, or 3, wherein said first measuring means measures the RSSI information of the assigned radio channel a plurality of times and thereby obtains the measurement values, and said correction means corrects, on the basis of said first correction table, the plurality of RSSI information measurement values obtained by the plurality of measurements at said first measuring means and takes the average of the corrected values and then determines the average to be the first measurement data item.

5. A radio communication apparatus according to claim 1, 2, or 3, wherein said second measuring means measures the RSSI information of each of the other radio channels a plurality of times and thereby obtains the measurement values of each of the other channels, and said correction means corrects, on the basis of said second correction table, the plurality of RSSI information measurement values obtained by the plurality of measurements at said second measuring means and takes the average of the corrected values and then determines the average to be the second measurement data item.

6. In a mobile radio communication system that assigns a radio channel by a TDMA scheme to a radio communication apparatus intending to communicate and enables said radio communication apparatus to get into radio communication with a base station via the assigned radio channel, said radio communication apparatus comprising:

automatic gain control means for performing an operation to keep constant the reception signal level of a radio signal sent from said base station;

control means for bringing said automatic gain control means into an operative state in a first period corresponding to said assigned radio channel and into an inoperative state in a second period corresponding to the other radio channels;

first measuring means for measuring the RSSI information of said assigned radio channel in said first period;

second measuring means for measuring the RSSI information of the other radio channels in said second period;

a first and second correction tables provided so as to correspond to the reception conditions for said automatic gain control means being set in an operative state and the reception conditions for said automatic gain control means being set in an inoperative state, respectively; and correction means for correcting the RSSI information measurement values obtained from said first measuring means on the basis of said first correction table and the RSSI information measurement values obtained from said second measuring means on the basis of said second correction table.

7. In a mobile radio communication system that assigns a radio channel by the selective use of an FDMA scheme and a TDMA scheme to a radio communication apparatus intending to communicate and enables said radio communication apparatus to get into radio communication with a base station in an analog or digital mode via the assigned radio channel, said radio communication apparatus comprising:

first measuring means for measuring the RSSI information of the digital radio channel in a first period corresponding to the digital radio channel assigned by said TDMA scheme;

second measuring means for measuring the RSSI information of the other digital radio channels in a second period excluding said first period;

third measuring means for measuring the RSSI information of the digital radio channel in a third period corresponding to the analog radio channel assigned by said FDMA scheme;

a first, second, and third correction tables provided so as to correspond to the reception conditions in said first, second, and third periods, respectively; and correction means for correcting the RSSI information measurement values obtained from said first, second, and third measuring means on the basis of said first, second, and third correction tables, respectively.

8. A method of measuring the RSSI information of a radio channel for use with a radio communication apparatus used in a mobile radio communication system that assigns a radio channel by a TDMA scheme to said radio communication apparatus intending to communicate and enables said radio communication apparatus to get into radio communication with a base station via the assigned radio channels said method comprising:

the step of measuring the RSSI information of the radio channel in a first period corresponding to said assigned radio channel;

the step of correcting the RSSI information measurement values obtained from the preceding step on the basis of first correction information previously set so as to correspond to the reception conditions in said first period;

the step of measuring the RSSI information of the other radio channels in a second period corresponding to an idle period excluding said assigned radio channel; and the step of correcting the RSSI information measurement values obtained from the preceding step on the basis of second correction information previously set so as to correspond to the reception conditions in said second period.

9. In a mobile radio communication system that assigns a radio channel by a TDMA scheme to a radio communication apparatus intending to communicate and enables said radio communication apparatus to get into radio communication with a base station via the assigned radio channel, said radio communication apparatus comprising:

first measuring means for measuring the quality of the radio channel in a first period corresponding to said assigned radio channel;

second measuring means for measuring the quality of the other radio channels in a second period corresponding to an idle period for the radio channels excluding said assigned radio channel;

first and second correction information provided so as to correspond to the reception conditions in said first period and the reception conditions in said second period; and correction means that corrects the quality measurement values obtained from said first measuring means on the basis of said first correction information and determines the corrected quality measurement values to be first measurement data and that corrects the quality measurement value obtained from said second measuring means on the basis of said second correction information and determines the corrected quality measurement values to be second measurement data.

10. A radio communication apparatus according to claim 9, wherein said first and second measuring means each starts the measurement of quality at the request of said base station, and said correction means corrects the quality measurement values obtained from said first and second measuring means and reports the corrected first and second measurement data items to said base station.

11. A radio communication apparatus according to claim 9, wherein said first and second measuring means each starts the measurement of quality independently, and said correction means corrects the quality measurement values obtained from said first and second measuring means, stores the corrected first and second measurement data items, and reads these first and second measurement data items at the request of said base station and then reports these data items to said base station.

12. A radio communication apparatus according to claim 9, 10, or 11, wherein said first measuring means measures the quality of the assigned radio channel a plurality of times and thereby obtains the measurement values, and said correction means corrects, on the basis of, said first correction information, the plurality of quality measurement values obtained by the plurality of measurements at said first measuring means and takes the average of the corrected values and then determines the average to be the first measurement data item.

13. A radio communication apparatus according to claim 9, 10, or 11, wherein said second measuring means measures the quality of each of the other radio channels a plurality of times and thereby obtains the measurement values of each of the other channels, and said correction means corrects, on the basis of said second correction information, the plurality of quality measurement values obtained by the plurality of measurements at said second measuring means and takes the average of the corrected values and then determines the average to be the second measurement data item.

14. In a mobile radio communication system that assigns a radio channel by a TDMA scheme to a radio communication apparatus intending to communicate and enables said radio communication apparatus to get into radio communication with a base station via the assigned radio channel, said radio communication apparatus comprising;

automatic gain control means for performing an operation to keep constant the reception signal level of a radio signal sent from said base station;

control means for bringing said automatic gain control means into an operative state in a first period corresponding to said assigned radio channel and into an inoperative state in a second period corresponding to the other radio channels;

first measuring means for measuring the quality of said assigned radio channel in said first period;

second measuring means for measuring the quality of the other radio channels in said second period;

first and second correction information provided so as to correspond to the reception conditions for said automatic gain control means being set in an operative state and the reception conditions for said automatic gain control means being set in an inoperative state, respectively, and correction means for correcting the quality measurement values obtained from said first measuring means on the basis of said first correction information and the quality measurement values obtained from said second measuring means on the basis of said second correction information.

15. In a mobile radio communication system that assigns a radio channel by the selective use of an FDMA scheme and a TDMA scheme to a radio communication apparatus intending to communicate and enables said radio communication apparatus to get into radio communication with a base station in an analog or digital mode via the assigned radio channel, said radio communication apparatus comprising:

first measuring means for measuring the quality of the digital radio channel in a first period corresponding to the digital radio channel assigned by said TDMA scheme;

second measuring means for measuring the quality of the other digital radio channels in a second period excluding said first period;

third measuring means for measuring the quality of the digital radio channel in a third period corresponding to the analog radio channel assigned by said FDMA scheme;

first, second, and third correction information provided so as to correspond to the reception conditions in said first, second, and third periods, respectively; and correction means for correcting the quality measurement values obtained from said first, second, and third measuring means on the basis of said first, second, and third correction information, respectively.

16. A method of measuring the quality of a radio channel for use with a radio communication apparatus used in a mobile radio communication system that assigns a radio channel by a TDMA scheme to said radio communication apparatus intending to communicate and enables said radio communication apparatus to get into radio communication with a base station via the assigned radio channel, said method comprising;

the step of measuring the quality of the radio channel in a first period corresponding to said assigned radio channel;

the step of correcting the quality measurement values obtained from the preceding step on the basis of first correction information previously set so as to correspond to the reception conditions in said first period;

the step of measuring the quality of the other radio channels in a second period corresponding to an idle period excluding said assigned radio channel; and the step of correcting the quality measurement values obtained from the preceding step on the basis of second correction information previously set so as to correspond to the reception conditions in said second period.

17. A radio communication apparatus usable in a TDMA mobile radio communication system in which said radio communication apparatus is assigned a radio channel for communicating with a base station, said radio communication apparatus comprising:

circuitry for measuring the quality of the assigned radio channel in a first time period which corresponds to the assigned radio channel and for measuring the quality of other radio channels in a second time period which corresponds to an idle time of said radio communication apparatus;

a memory for storing first correction data corresponding to reception conditions in said first time period and second correction data corresponding to reception conditions in said second time period; and a controller for correcting measurements of the quality of the assigned radio channel using the first correction data and correcting measurements of the quality of the other radio channels using the second correction data.

* * * * *